(12) United States Patent
Watanabe et al.

(10) Patent No.: US 7,703,984 B2
(45) Date of Patent: Apr. 27, 2010

(54) ROLLING BEARING

(75) Inventors: Yasuyuki Watanabe, Iwata (JP); Naoki Shibamoto, Iwata (JP); Akihiko Katayama, Iwata (JP)

(73) Assignee: NTN Corporation, Osaka-Fu (JP)

( * ) Notice: Subject to any disclaimer, the term of this patent is extended or adjusted under 35 U.S.C. 154(b) by 1090 days.

(21) Appl. No.: 11/366,389

(22) Filed: Mar. 3, 2006

(65) Prior Publication Data
US 2006/0204155 A1 Sep. 14, 2006

(30) Foreign Application Priority Data
Mar. 11, 2005 (JP) ............... 2005-069815
May 24, 2005 (JP) ............... 2005-151433

(51) Int. Cl.
*F16C 33/34* (2006.01)
*F16C 33/62* (2006.01)
(52) U.S. Cl. ............... 384/492; 384/625; 74/569; 475/348
(58) Field of Classification Search ........... 384/492, 384/625; 74/569; 475/348
See application file for complete search history.

(56) References Cited
U.S. PATENT DOCUMENTS
4,696,581 A 9/1987 Tsushima et al.

2004/0079310 A1 4/2004 Suzuki et al.
2004/0190808 A1 9/2004 Maeda et al.
2004/0247216 A1 12/2004 Ichikawa et al.

FOREIGN PATENT DOCUMENTS
| EP | 1 411 142 A1 | 4/2004 |
| EP | 1 462 669 A2 | 9/2004 |
| EP | 1 484 517 A2 | 12/2004 |
| JP | 2004-3627 | 1/2004 |

OTHER PUBLICATIONS

European Search Report issued Feb. 14, 2008 in European Application No. EP 06 25 1151.

*Primary Examiner*—William C Joyce
(74) *Attorney, Agent, or Firm*—Wenderoth, Lind & Ponack, L.L.P.

(57) ABSTRACT

A rolling bearing comprises a roller, a roller shaft provided inwardly of the roller, and rolling elements provided between the roller and the roller shaft, the roller shaft having a nitrogen-rich layer and is configured such that its race surface, on which the rolling elements run, has not smaller than 11 in the JIS austenite grain size number and not smaller than HV653 in the Vickers hardness number, at both ends not greater than HV300, and at its core beneath a widthwise midpoint of the race surface not smaller than HV550.

8 Claims, 13 Drawing Sheets

Heat pattern H1

Heat pattern H2

ROLLING BEARING

BACKGROUND OF THE INVENTION

1. Field of the Invention

The present invention relates to a rolling bearing and more particularly to a rolling bearing which is improved in both fatigue fracture strength and rolling contact fatigue life. The rolling bearings are designed for supporting, for example, rocker arms for opening and closing the intake valve or exhaust valve in an automobile engine or supporting planet gears in a planetary gear mechanism.

2. Description of the Background Art

Such rolling bearings for supporting the rocker arms and the planet gears in a planetary gear mechanism are now in demand for sustaining, as a full complement roller bearing with the use of no cage, a heavier, high-speed load. This specification does not distinguish the full complement roller bearing from any other rolling bearing but refers to the rolling bearing comprehensively. In the rolling bearing with no cage, rolling elements may collide against each other and thus an insufficient lubrication can cause surface origin flaking of rolling elements or raceway surfaces.

Also, when the rollers run at higher speeds, their surfaces can be damaged due to mounting error or unbalanced load or they can skew in the movement with no proper positional controlling. This will result in surface origin flaking due to slippage or subsurface origin flaking due to a local increase in operating surface stress. As a result, the heat by slippage and the local increase in operating surface stress can cause surface damage such as peeling, smearing, surface origin flaking, and subsurface origin flaking depending on the load being applied.

Some schemes listed below have been proposed for eliminating the above drawbacks.

(1) A bearing for supporting a cam follower in a valve driving mechanism of an engine is disclosed in Japanese unexamined patent publication 2000-38907 and has a calculated life increased up to 1000 hours or more at the rated number of engine revolutions.

(2) A bearing for supporting a cam follower in a valve driving mechanism of an engine is disclosed in Japanese unexamined patent publication H10-47334 and contains 10% to 25% of carbide, the dissolution of retained austenite decreased to $\frac{1}{10}$ to $\frac{3}{10}$ the original, HV830 to HV960 in the Vickers hardness at its ends and not longer than 25 μm in the average wavelength for surface roughness, where its steel material is subjected to carbonitriding and hard-shot peening.

(3) A cam follower shaft disclosed in Japanese unexamined patent publication H10-103339 is coated with a solid lubricant layer of polymer compound for improving the anti-friction property.

(4) A cam follower shaft disclosed in Japanese unexamined patent publication H10-110720 is made of tool steels and subjected to ion nitriding and ion plating at a temperature lower than a tempering temperature for an increased hardness.

(5) In a bearing for supporting a cam follower shaft in a valve driving mechanism of an engine disclosed in Japanese unexamined patent publication 2000-38906, bending stresses imposed on the shaft is limited to not higher than 150 MPa.

(6) In a cam follower in a valve driving mechanism of an engine disclosed in Japanese unexamined patent publications 2000-205284 and 2002-31212, the raceway surface of a bearing component is protected with a phosphate coating which is improved in the lubricant retaining ability.

(7) In a cam follower in a valve driving mechanism of an engine disclosed in Japanese unexamined utility-model publication S63-185917, a shaft surface on which rollers roll is crowned.

(8) Japanese unexamined patent publication 2002-194438 discloses a shaft having a raceway surface subjected to high-density carburizing or carbonitriding for increasing the concentration of carbon to 1.2% to 1.7% while its core has the Vickers hardness number of HV300.

However, the cam follower provided with a roller in an engine is often attached to a rocker arm in such a manner that opposite ends of its shaft are deformed as by swaging and being anchored to the rocker arm. The shaft ends have to remain soft for ease of the swage locking while the central portion providing raceway surface is required to have an increased hardness. Some schemes have also been developed for the purpose (See Japanese unexamined patent publications H5-321616 and S62-7908 and Japanese examined patent publications H6-15811 and H6-80287).

Similarly, an inner member of a bearing in a planetary gear mechanism is also required to have an increased hardness at its raceway surface while at opposite ends it should remain soft for ease of the swage locking. Some schemes for the purpose have been developed (See Japanese Patent Laid-open Publications No. 2003-301933 and 2004-003627).

SUMMARY OF THE INVENTION

As a rolling bearing for supporting a rocker arm for opening and closing an intake valve or an exhaust valve in an automobile or for use in a planetary gear mechanism of an automatic transmission in an automobile has been demanded to meet the higher speed and loading conditions and the low viscosity of lubricants, its improvement in the property is crucially desired. It is thus essential for such rolling bearings used under the foregoing hostile conditions to increase component life and improve the strength and the fatigue fracture strength in particular.

It is an object of the present invention to provide a rolling bearing which is improved in strength for use under hostile conditions and having increased life for suppressing surface damage, such as surface origin flaking, and subsurface origin flaking and yet capable of being swaged or staked at an end thereof.

A rolling bearing according to the present invention is provided for supporting the rocker arm for opening and closing a valve in an automobile engine or a planetary gear mechanism of an automatic transmission in an automobile. The rolling bearing comprises an outer member, an inner member provided inwardly of the outer member, and rolling elements provided between the inner and outer members, wherein at least one of the inner and outer members has a nitrogen-rich layer and is arranged at a raceway surface thereof, on which the rolling elements run, not smaller than 11 in the JIS austenite grain size number and not smaller than HV653 in the Vickers hardness number, at both ends thereof not greater than HV300 in the Vickers hardness number, and at a core thereof beneath a widthwise midpoint of the raceway surface not smaller than HV550 in the Vickers hardness number.

According to the above arrangement, the rolling bearing can be improved to the end that the raceway region ensures an increased life, suppressing the surface damage such as surface origin flaking and subsurface origin flaking. Yet, mechanical joining as by swaging is facilitated as the ends of at least one of the inner and outer members are modified to a desired level of hardness. The hardness of the at least one member may further be increased for improving the fatigue fracture strength. When the austenite grain size number at the raceway region is lower than 11, the rolling contact life will hardly increase under hostile conditions. Thus, the austenite grain size number at the raceway region is set to 11 or higher. The nitrogen-rich layer is hardened by induction hardening so as to fine the microstructure for increasing the toughness. The austenite grains are crystals of austenite which has phase transformed during the heating in the hardening process and can thus remain as the result of history after having transformed to martensite by the cooling process. The austenite grains may be grain boundaries which are explicitly observed when its metal phase sample to be examined having been exposed by etching or any other technique. The grain boundary when heated just prior to the hardening process is also termed old austenite grain. The austenite grain size may be expressed by the JIS grain size number in average or by a two-dimensional or three-dimensional interval which is calculated by multiplying by a compensating factor the average of intervals determined by intersection with the grain boundary of a straight line overlaid at a random direction on the metal phase using a slicing technique.

The nitrogen-rich layer developed by a process of carbonitriding, as will be explained later, may be enriched with carbon, or may not be enriched. The regions other than the raceway region may contain ferrite and carbide in a microstructure.

Ferrite is the alpha phase of iron which contains dislocations at not higher density as is unlike martensite. Ferrite may be developed by slow cooling of austenite in gamma phase or by hardening and tempering. While ferrite is low in the dislocation density, carbide such as cementite remains dispersed in aggregated forms. The microstructure containing ferrite and carbide is thus found in a softened state. The microstructure in a softened state may remain in the other regions than the raceway region. In particular, as the journal ends of the members have to be not higher than HV300 in the Vickers hardness number, they advantageously incorporate the softened state of the microstructure.

While the carbide is commonly cementite, $Fe_3C$, it may be replaced by carbon-nitride such as $Fe_3(C, N)$, because the nitrogen-rich layer contains an abundance of nitrogen, not so much as carbon though. It should be understood that for sake of simplicity, the term, carbide, includes carbon-nitride as well hereinafter. Steel material commonly contains Mn among others, as in solid solution in the carbide expressed by $(Fe, Mn)_3(C, N)$. Moreover, as the tempering is conducted at higher temperatures, its resultant carbide products include, in addition to the above carbide, $M_3C$, $M_{23}C_6$, and any other form of carbide.

Also, the raceway region may be hardened by induction hardening. This allows the hardened structure of very fine grains to be produced by the treatment within a short duration of time. Accordingly, the rolling bearing with a higher strength and an increased fatigue fracture strength can be obtained at small cost without a decline in the resistance to surface defect and the rolling contact fatigue life.

The hardness at the raceway surface may be not lower than HV653 while the hardness at the core beneath the raceway surface may be not lower than HV550. This can protect the raceway surface from surface damage and subsurface origin flaking, thus increasing the component life. Simultaneously, the core beneath the raceway surface can be improved in strength and in fatigue fracture strength. If the hardness at the raceway surface is lower than HV653, the life can hardly be lengthened under the above described conditions. Also, if the hardness at the core beneath the raceway surface is lower than HV550, the rolling bearing can rarely improve the fatigue fracture strength to match the high speed and loading of an automobile engine.

The raceway surface may contain 10% to 50% by volume of retained austenite while the core beneath the raceway surface may also contain some retained austenite. This allows crack growth due to surface origin flaking or subsurface origin flaking on the raceway surface to be prevented and the core to be improved in physical strength by the induction hardening. If the retained austenite in raceway surface is smaller than 10% by volume, the rolling bearing can hardly increase the life under the hostile conditions. However, if the retained austenite exceeds 50% by volume, its structure will stay not very fine, hence shortening the life under the hostile conditions. Also, the core is hardened by induction hardening and contains some retained austenite not so much as the raceway surface though. The retained austenite is present because the effect of the hardening reaches the core.

The measurement of retained austenite may be carried out using any known method such as X-ray refraction or transmission electron microscopy (TEM). The austenite unlike ferrite or cementite is not a ferromagnetic substance and can thus be measured with the use of a magnetic meter such as a magnetic balance.

At least one of the inner and outer members may be subjected to carbonitriding at a temperature higher than the A1 transformation point, slow cooled to a temperature lower than the A1 transformation point and then induction hardened over the raceway region. The A1 transformation point is equal to a eutectic temperature, e.g. 723° C. for Fe—C. The A1 transformation point of a steel material commonly used for the rolling bearing is about the same.

As having been processed by the foregoing technique, the raceway region can be less susceptible to undesired damage and increased in the life while the other regions remain soft enough to be swage locked. Because of a combination of the processes of carbonitriding and induction hardening at the raceway region, the JIS austenite grain size number is not smaller than 11, the retained austenite is 10% to 50% by volume, and the hardness is not lower than HV653. Also, the other regions such as the journal ends where the induction hardening is less effected is not higher than HV300 in the hardness because of the step of slow cooling or the step of quenching followed by tempering after the process of carbonitriding.

The rolling bearing according to the present invention is characterized in that at least one of the inner and outer members has a nitrogen-rich layer and its ends remain soft, hence improving the resistance against damage while facilitating mechanical joining as by swage locking. Also, the induction hardening ensures that the fatigue fracture strength and rolling contact fatigue strength and the resistance to surface damage are gained at a short period of time. In particular, the race surface region is modified to contain a certain degree of the retained austenite, suppressing cracks which can develop and extend under cyclical loading.

These and other objects and features of the present invention will be more apparent from the following description in conjunction with the accompanying drawings.

DETAILED DESCRIPTION OF THE INVENTION

Figure 1:
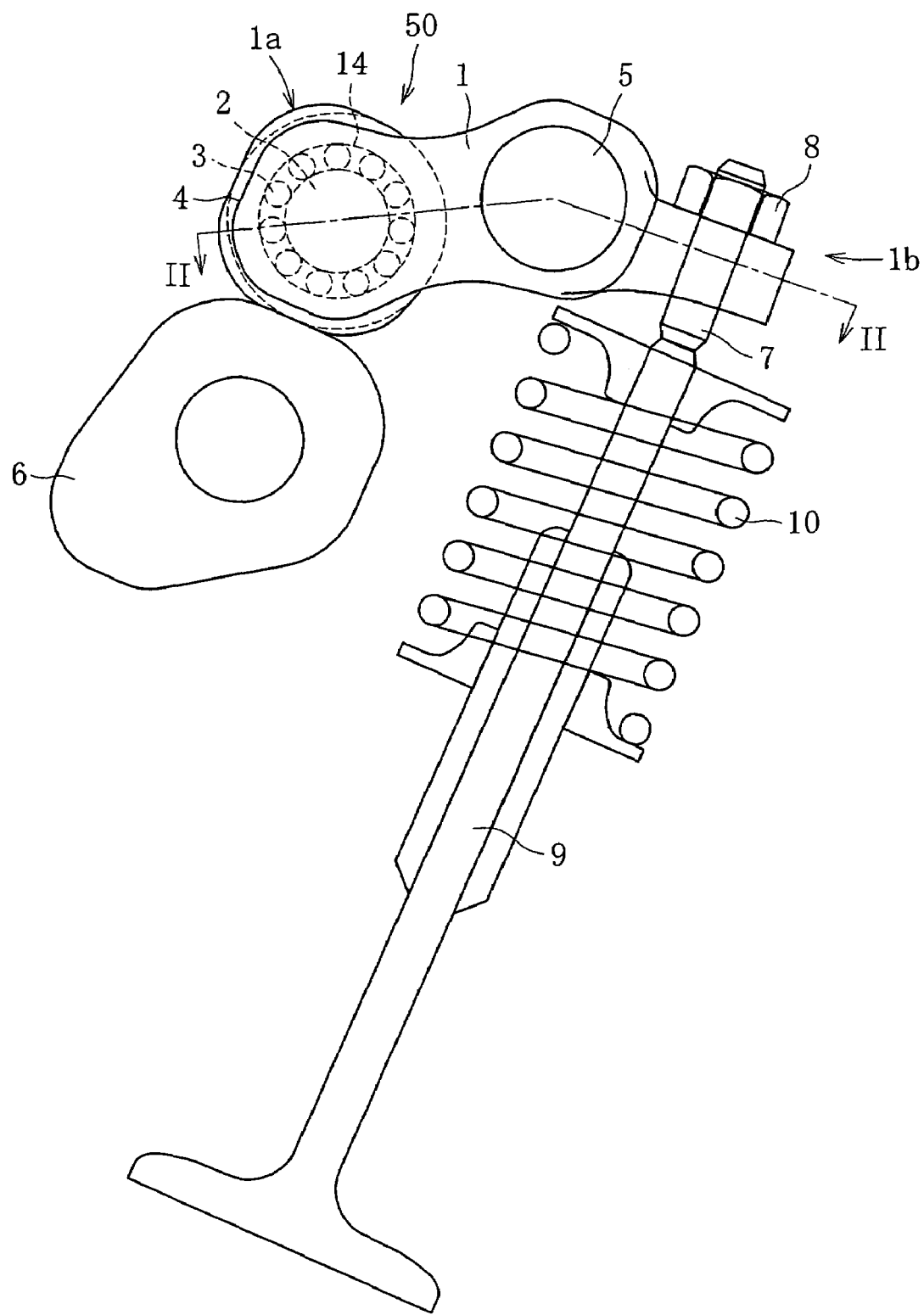
FIG. 1 illustrates a rolling bearing for supporting the rocker arm according to one embodiment of the present invention.
Figure 2A:
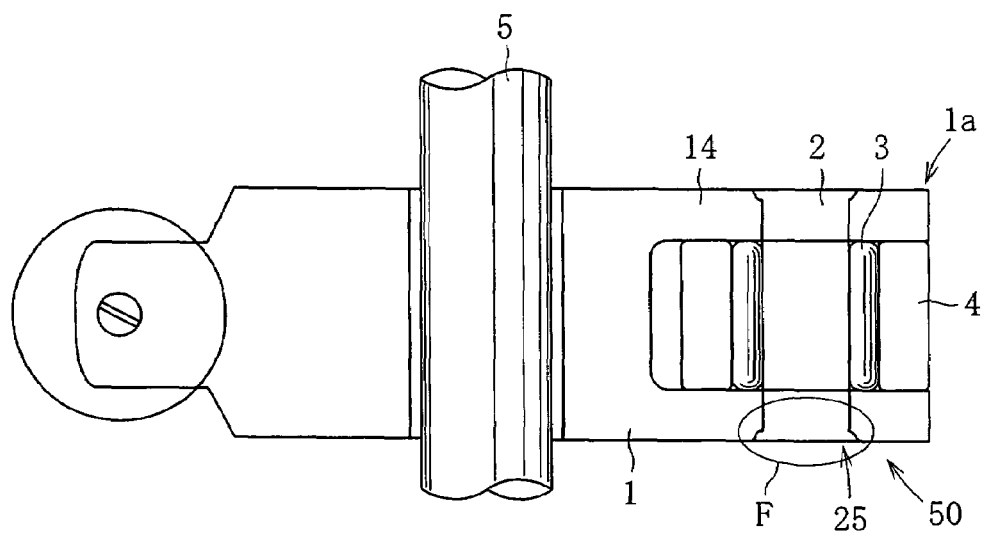
FIG. 2A is a cross sectional view taken along the line II-II of FIG. 1.

An embodiment of the present invention will now be described in the form of a rolling bearing for rocker arm. Referring to FIGS. 1 and 2A, a rocker arm 1 is provided as a pivoting member and supported pivotably at the center region by a pivot shaft 5 via a bearing metal or the like.

The rocker arm 1 has an adjusting screw 7 threaded into one end 1b thereof. As the adjusting screw 7 is tightened with a lock nut 8, its lower end remains in direct contact with the upper end of a valve 9 of an intake valve or an exhaust valve in an internal combustion engine. The valve 9 is urged by the resilient force of a spring 10.

The other end 1a of the rocker arm 1 incorporates a cam follower body 50 which includes a bifurcated roller holder 14. A roller 4 which acts as an outer bearing member is rotatably supported via rollers 3, which are rolling elements, on the center region of a roller shaft 2. The axes of the rollers 3 extend in parallel with the axis of the roller shaft 2. The roller 4 is urged by the resilient force of the spring 10 thus to remain in direct contact with the cam face of a cam 6 mounted on a cam shaft.

Figure 2B:
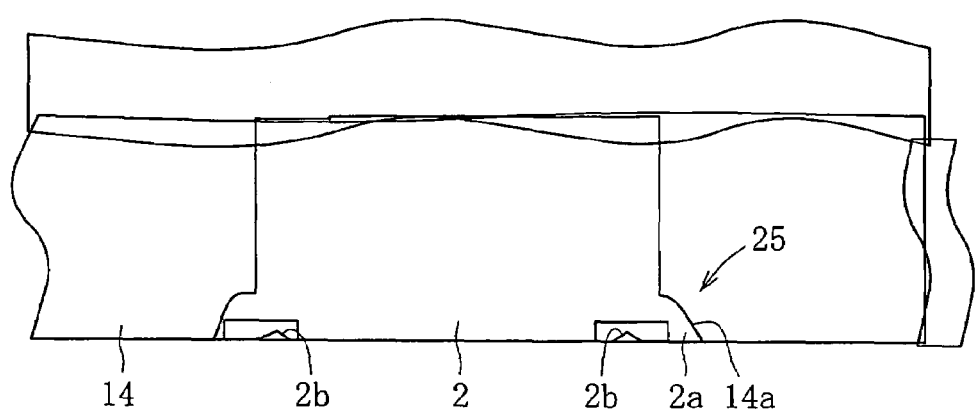
FIG. 2B is an enlarged view showing a region denoted by F in FIG. 2A where a swage locking is applied.

As illustrated in FIG. 2B which is an enlarged view of the region F of FIG. 2A, the bifurcate roller holder 14 has beveled sides 14a thereof adapted as staking or swage-locking ends 25 to be joined by swage locking to both ends 2a of the roller shaft 2. Each end 2a of the roller shaft 2 which acts as the inner bearing member has a staking or swage locking portion 2b thereof provided for being deformed to fill a gap between the outer side of the end 2a and the beveled side 14a. To that end, the opposite ends 2a of the roller shaft the Vickers hardness number not higher than HV300 for ease of deformation which results in the swage locking ends 25 within the beveled sides of the roller holder.

The roller shaft 2, the rollers 3, and the roller 4 constitute in a combination a rolling bearing for rocker arm. Generally, roller bearings with no cage are referred to as full complement roller bearings, though, no such distinction is drawn herein as described previously. The rolling bearing for rocker arm rolls while remaining in contact with the cam 6, so that the roller 4 receives both a pressing force and an impulsive force from the cam 6.

In the rolling bearing of this embodiment, the roller shaft 2 includes a nitrogen-rich layer and its outer raceway surface on which the rolling elements run is subjected to induction hardening for having the JIS austenite grain size number of 11 JIS or higher and the Vickers hardness number of not smaller than HV653. The regions other than the raceway region (the raceway surface and the core) of the roller shaft 2 are relatively rough and having the ferrite grain size or austenite grain size number of 10 or lower. Opposite ends of the roller shaft 2 are as less hardened as not higher than HV300. As the raceway region of the roller shaft 2 is subjected to induction hardening, its retained austenite is as high as 10% to 50% by volume. The core of a widthwise midpoint of the roller shaft 2 is subjected to induction hardening at the same time as of the race surface region, so that it is hardened and possesses retained austenite. As the result, the roller shaft 2 can be protected at the raceway region from surface damage and subsurface origin flaking which depends largely on loads and improved in the physical strength and fatigue fracture strength in particular at both the raceway surface and the core. On the other hand, the other regions including the roller shaft ends remain low in the hardness, facilitating deformation for mechanical joining as by staking or swaging.

Figure 3:
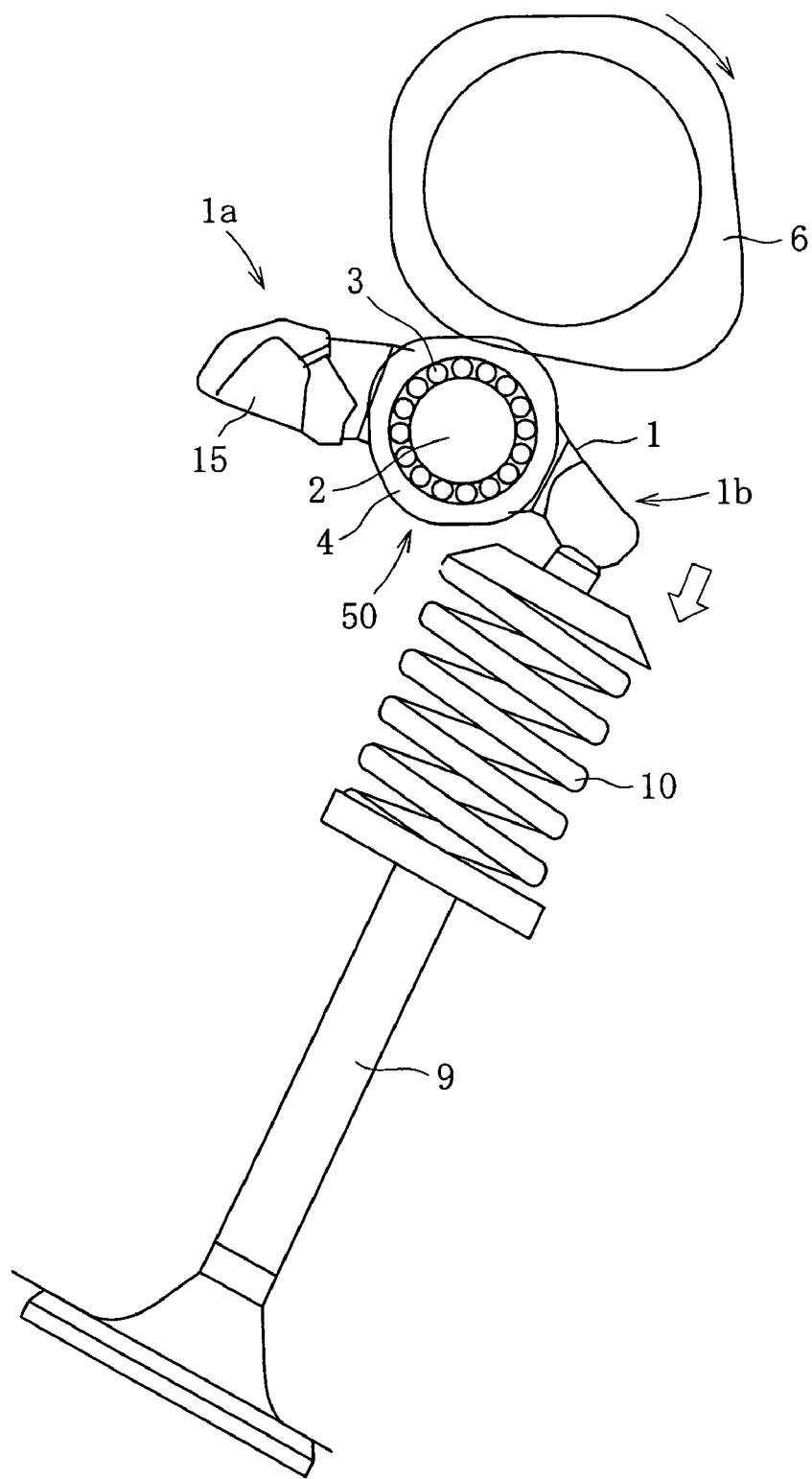
FIG. 3 illustrates a rolling bearing for supporting the rocker arm according to another embodiment of the present invention.

FIG. 3 illustrates the rolling bearing for rocker arm according to another embodiment of the present invention. The cam follower body 50 in this embodiment has a roller hole (not shown) provided therein between the ends 1a and 1b of the rocker arm 1 across which the roller shaft 2 extends. While the end 1b of the rocker arm 1 remains in contact with the valve 9 for opening and closing in an internal combustion engine, the other end 1a receives a pivot not shown. The cam follower body 50 with a pivot receiver 15 is urged in one direction by the spring 10. Upon the roller 4 receiving the driving force from the cam 6, the cam follower body 50 drives the valve 9 against the urging force of the spring 10. While no cage is provided, the rolling elements 3 roll between the roller shaft 2 and the roller 4.

Figure 4:
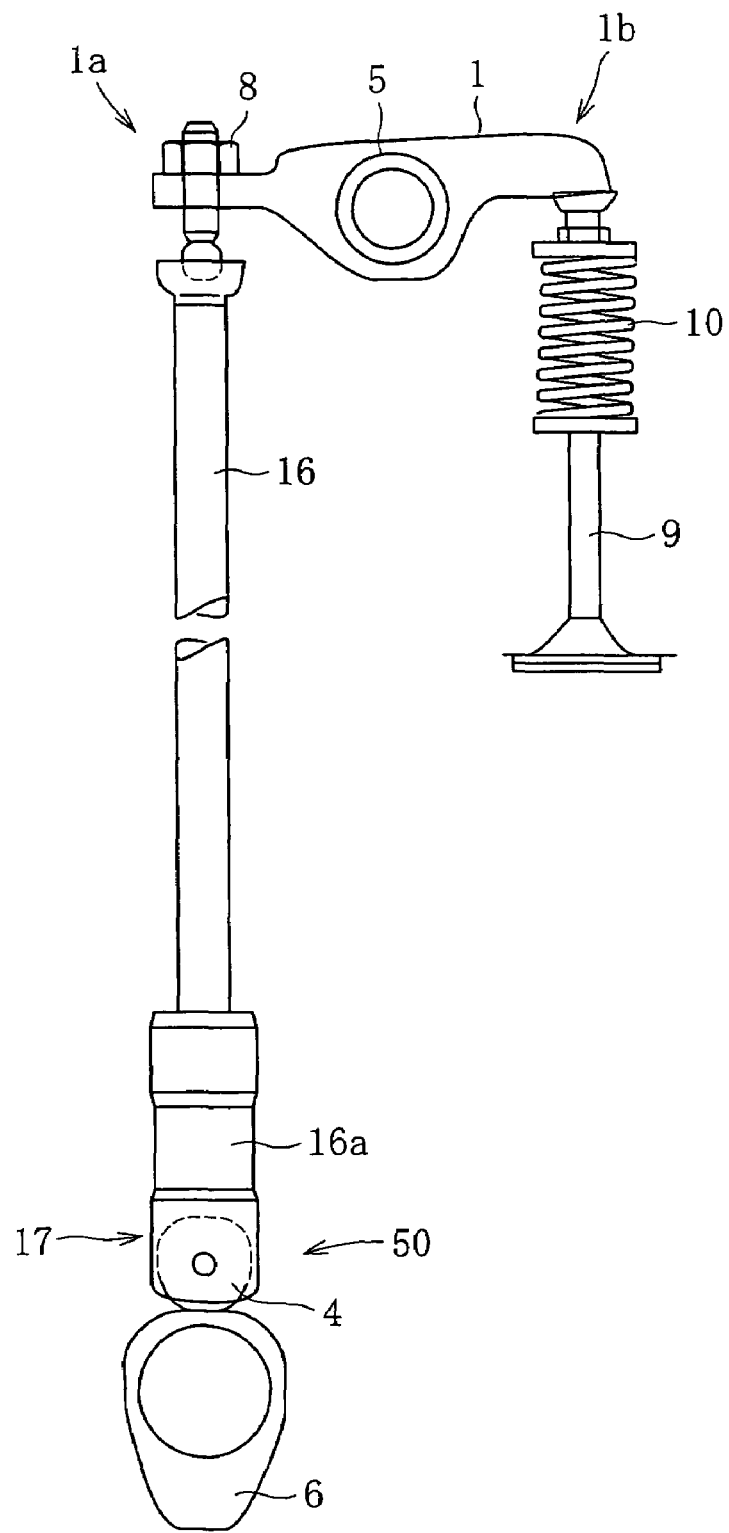
FIG. 4 illustrates a rolling bearing for supporting the rocker arm according to a further embodiment of the present invention.
Figure 5:
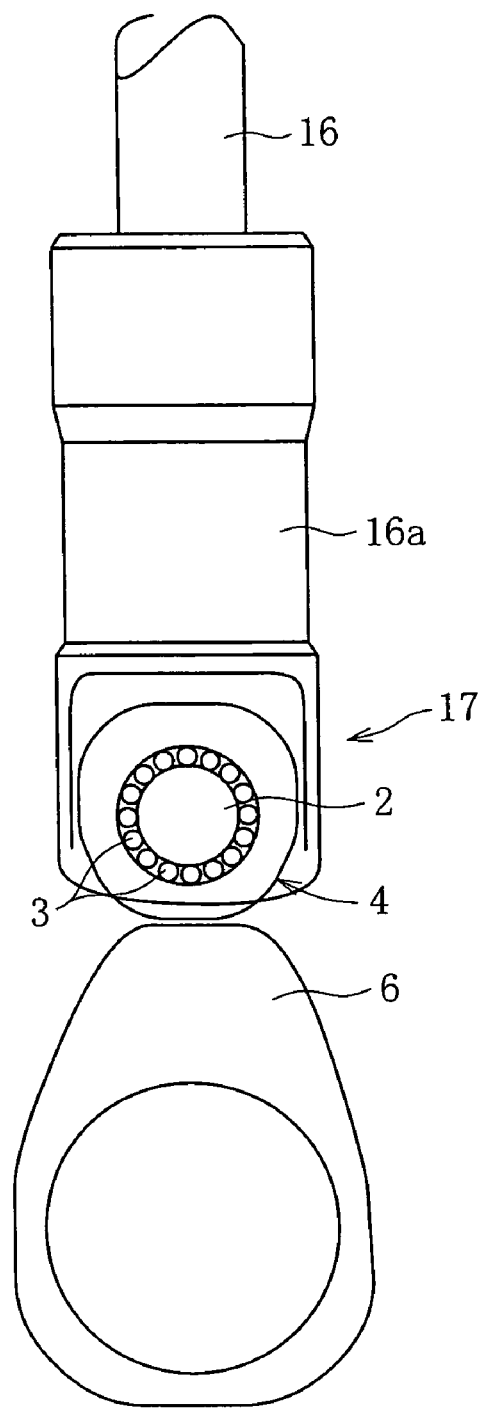
FIG. 5 is an enlarged view showing a region where the rolling bearing shown in FIG. 4 is in direct contact with a cam of a cam follower with a roller in an engine.
Figure 6A:
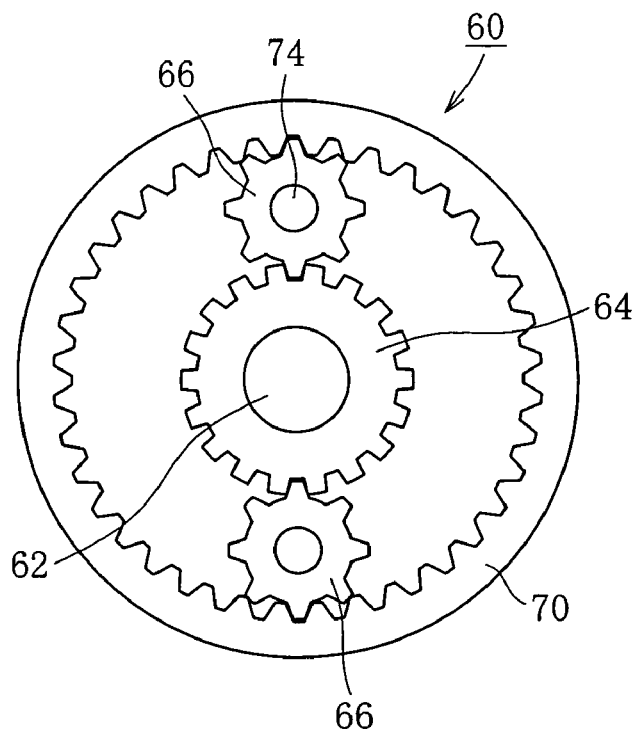
FIG. 6A is a front view of a planetary gear mechanism.
Figure 6B:
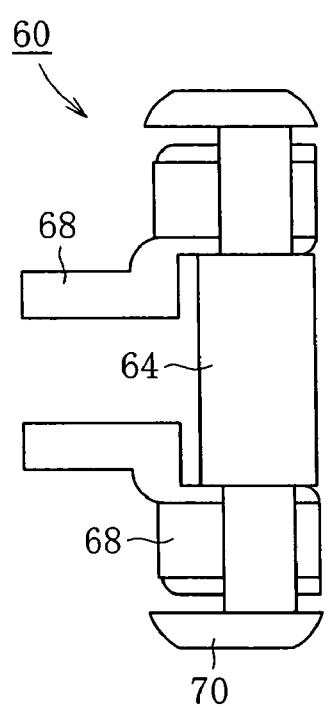
FIG. 6B is a longitudinally cross sectional view of the planetary gear mechanism.
Figure 6C:
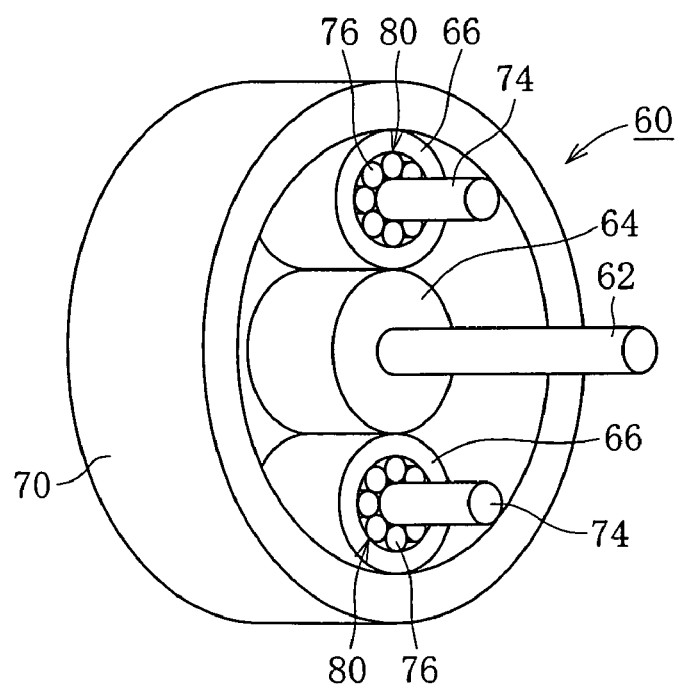
FIG. 6C is a perspective view of the planetary gear mechanism.
Figure 7:
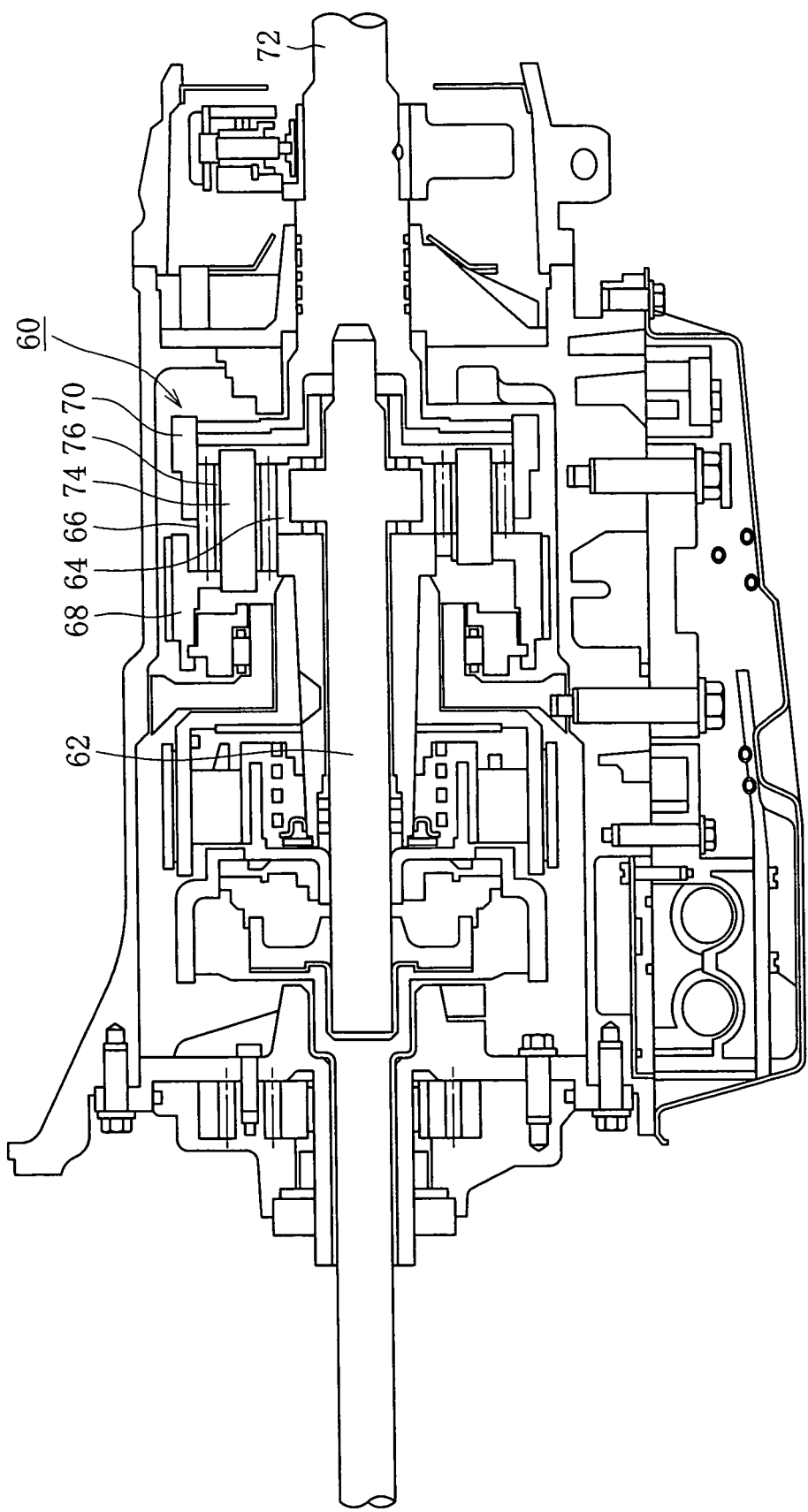
FIG. 7 is a longitudinally cross sectional view of an automatic transmission.

FIG. 4 illustrates the rolling bearing for rocker arm according to a further embodiment of the present invention. FIG. 5 illustrates an enlarged view of the rolling bearing shown in FIG. 4. As shown in FIG. 4, the rocker arm 1 is supported at the center region by the pivot shaft 5 for pivotal movement. While the end 1b of the rocker arm 1 remains in direct contact with the upper end of the engine valve 9, the other end 1a is seated on the upper end of a connecting rod 16. An adjusting screw 8 is provided for controlling the clearance between the end 1a of the rocker arm 1 and the upper end of the connecting rod 16.

The cam follower body 50 is mounted to a hollow bearing holder 16a at the lower end of the connecting rod 16 to which the rolling bearing for rocker arm is mounted by a mounting member 17. The driving force of the cam 6 is transmitted via the roller 4 of the rolling bearing to the connecting rod 16. Similar to the previous embodiment, no cage is provided and the rolling elements 3 roll between the roller shaft 2 and the roller 4.

The roller shaft 2 acting as an inner member of the rolling bearing for rocker arm is subjected to heat treatment, which will now be described, for developing a fine austenite grain property at the outer surface region.

The roller shaft 2 shown in FIGS. 3 and 5 and acting as the inner member contains a nitrogen-rich layer and its outer raceway surface on which the rolling elements run is subjected to induction hardening for providing the JIS austenite grain size number of 11 (JIS) or higher and the Vickers hardness number of not smaller than HV653. The other regions than the raceway region (the raceway surface and the core) of the roller shaft 2 are relatively rough with the JIS austenite grain size number of 10 or lower. Opposite ends of the roller shaft 2 are as less hardened as not higher than HV300. As the raceway surface on which the rolling elements run is subjected to induction hardening, its retained austenite is as high as 10% to 50% by volume. The core of a widthwise midpoint of the roller shaft 2 is subjected to induction hardening at the same time as of the outer race surface region, so that it is hardened and possesses retained austenite. As the result, the roller shaft 2 can be protected at the raceway surface from surface damage and subsurface origin flaking which depends largely on loads and improved in the physical strength and fatigue fracture strength in particular at both the raceway surface and the core. On the other hand, the other regions including the roller shaft ends remain low in the hardness, facilitating deformation for mechanical joining as by staking or swaging. This allows the roller shaft to be joined at both ends by swage locking to the beveled sides of the roller shaft holder.

A further embodiment of the present invention is in the form of a rolling bearing for supporting a planet gear in a planetary gear mechanism. As shown in FIGS. 6A to 6C and FIG. 7, the planetary gear mechanism 60 includes a plurality of planet gears 66 provided between a sun gear shaft 62 and an internal gear shaft 72 and engaged with a sun gear 64 and an internal gear 70 for driving an automatic transmission. The sun gear 64 has teeth provided on the outer side thereof and is arranged integral with the sun gear shaft 62. The internal gear 70 has teeth provided on the inner side thereof and is arranged integral with the internal gear shaft 72. The planet gears 66, which is interposed between the sun gear 64 and the internal gear 70 and is in engagement with both the sun gear 64 and the internal gear 70, are arranged to rotate on their own axes and travel in a circle about the sun gear 64. The gears in the planetary gear mechanism 60 remain engaged with one another so that they can trigger and lock the movement of the sun gear 64, a planet carrier 68, or the internal gear 70 for modifying the number of rotations, the direction of the rotation, the torque, and so on of the internal gear shaft 72 in relation to the sun gear shaft 62.

Figure 8:
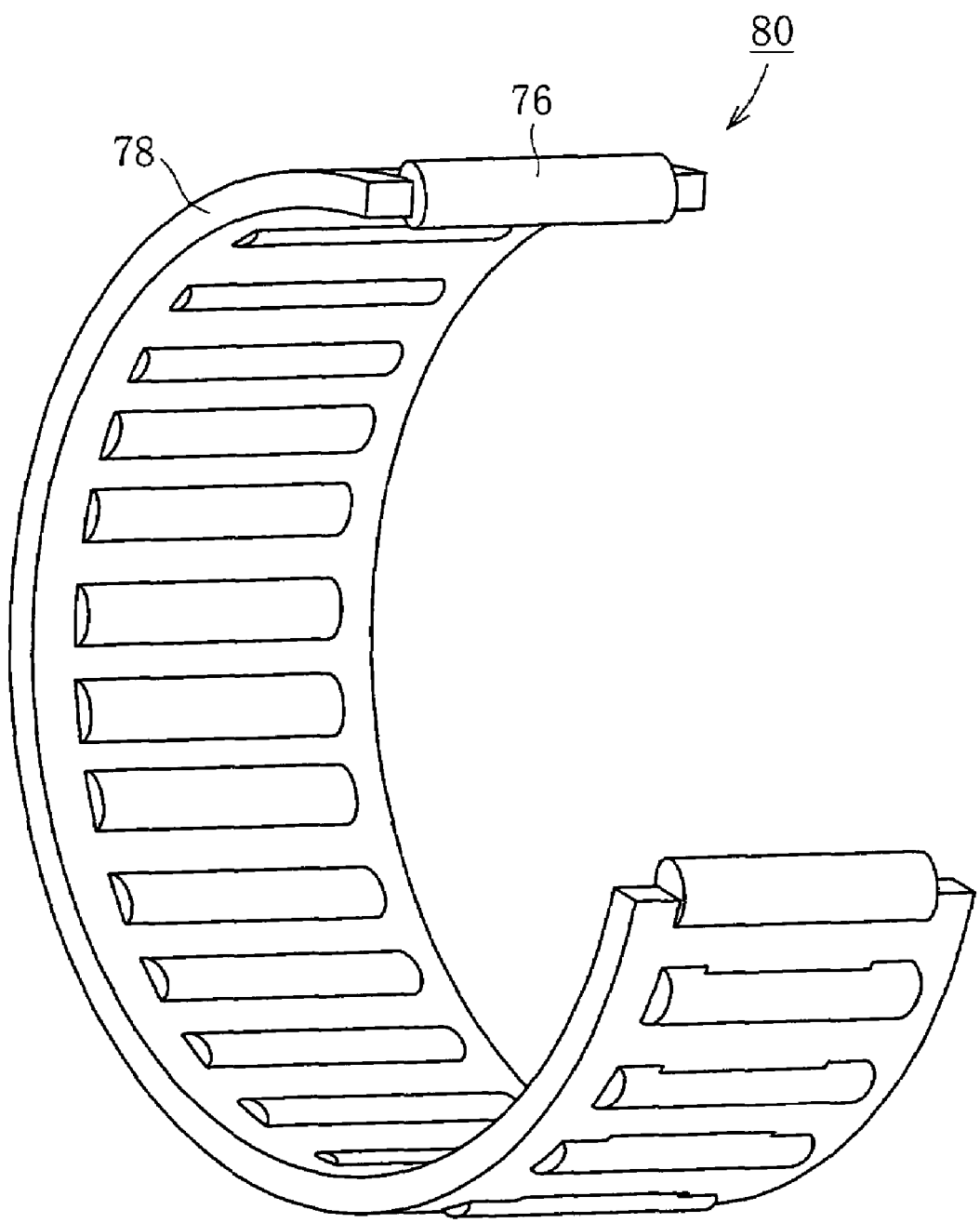
FIG. 8 is a perspective view, partially in fragment, of a needle roller bearing.

The planet gear 66 is rotatably mounted by a rolling bearing 80 to the planet gear shaft 74 in the planetary gear mechanism 60. The planet gear shaft 74 is rotatably supported on the planet carrier 68 via a shaft. As known, the rolling bearing comprises commonly an inner ring (inner member), an outer ring (outer member), and rolling elements so that the rolling elements roll between the outside race of the inner ring and the inside race of the outer ring. The rolling bearing 80 of this embodiment is a radial needle roller bearing as shown in FIG. 8, where a series of needle rollers 76 are held at equal intervals in a cage 78. The outer side of the planet gear shaft 74 provides the inside race while the inner side of the planet gear 66 provides the outside race. Accordingly, the planet gear shaft 74 and the planet gear 66 serve as the inner member and the outer member of the rolling bearing 80, respectively.

The inner member of the rolling bearing 80 may be implemented by an inner ring mounted to the outer side of the planet gear shaft 74 as provided separately of the planet gear shaft 74. Similarly, the outer member of the rolling bearing 80 may be implemented by an outer ring mounted to the inner side of the planet gear 66 as provided separately of the planet gear 66.

The planet gear shaft 74 acting as the inner member of the rolling bearing 80 is subjected to heat treatment, which will now be described, for providing a fine austenite grain property at the surface region.

In the rolling bearing of this embodiment, the planet gear shaft 74 acting as the inner member includes a nitrogen-rich layer and its raceway surface on which the rolling elements run is subjected to induction hardening for having the JIS austenite grain size number of 11 or higher and the Vickers hardness number of not smaller than HV653. The other regions than the raceway region (the raceway surface and the core) of the roller shaft 2 are relatively rough with the JIS austenite grain size number of 10 or lower. Opposite ends of the roller shaft 2 are as less hardened as not higher than HV300. The raceway surface on which the rolling elements run is subjected to induction hardening, containing retained austenite as high as 10% to 50% by volume. The core of a widthwise midpoint of the planet gear shaft 74 is subjected to induction hardening at the same time as of the raceway surface, so that it is hardened and possesses retained austenite. As the result, the planet gear shaft 74 can be protected at the raceway surface from surface damage and subsurface origin flaking which depends largely on loads and improved in the physical strength and fatigue fracture strength in particular at both the raceway surface and the core. On the other hand, the other regions including the planet gear shaft ends remain low in the hardness, facilitating deformation for mechanical joining as by staking or swaging.

Figure 9:
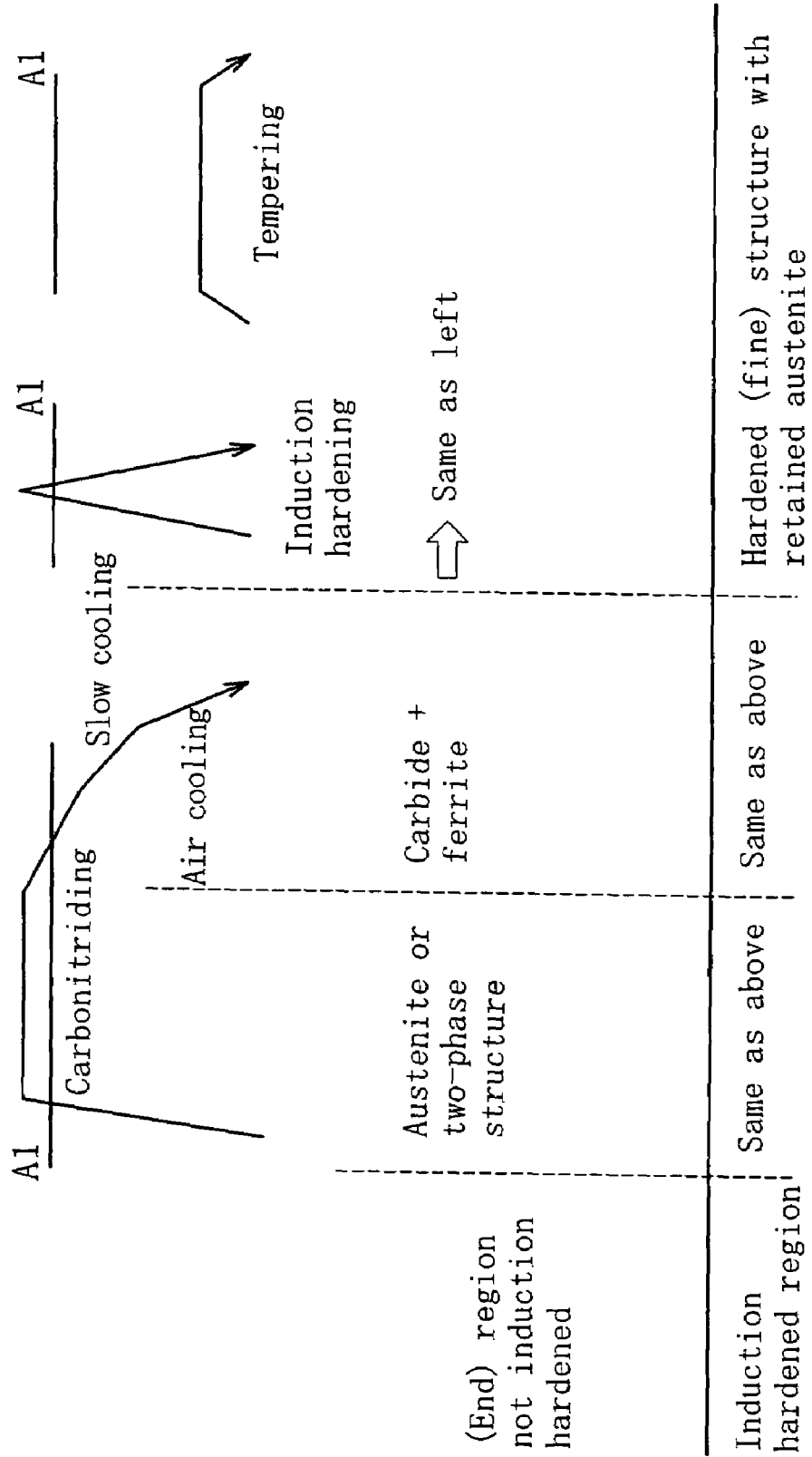
FIG. 9 is a profile showing a pattern of heat treatment according to an embodiment of the present invention.
Figure 10:
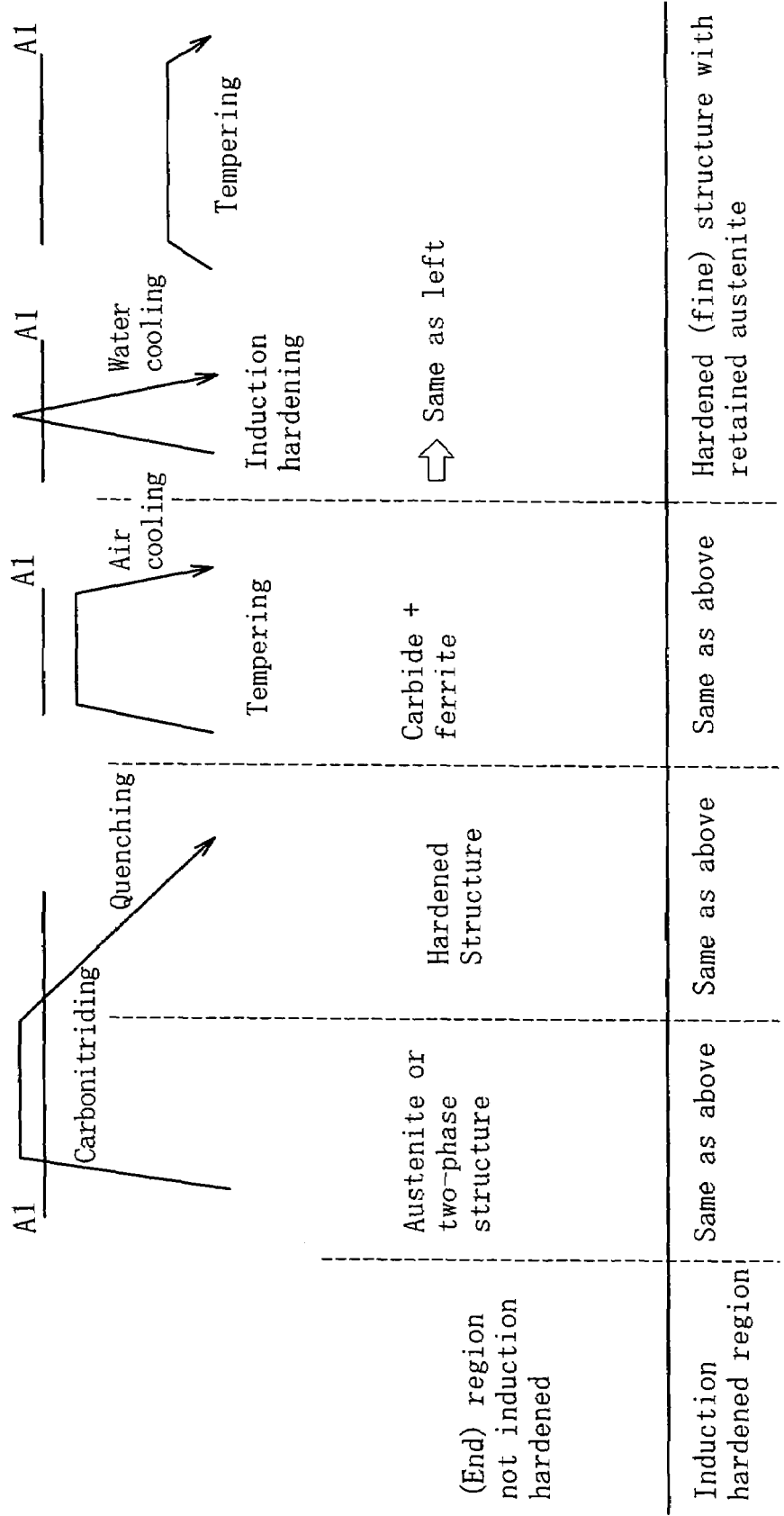
FIG. 10 is a profile showing another pattern of heat treatment according to an embodiment of the present invention.

Next, the heat treatment including carbonitriding of the inner member (the roller shaft 2 or the planet gear shaft 74) of the rolling bearing will be described. FIG. 9 illustrates steps of carrying out the heat treatment according to the present invention. FIG. 10 illustrates a modification of the heat treatment. The action shown in FIG. 9 includes the steps of carbonitriding at a temperature higher than A1 transformation point directly followed by slow cooling. In the action shown in FIG. 10, the step of carbonitriding is followed by a quenching step and, when the temperature is below the A1 transformation point, a step of tempering is conducted. The slow cooling step shown in FIG. 9 and the tempering step shown in FIG. 10 are identical in the effect where the other regions, e.g., the journal ends, than the raceway region are lowered in the hardness. After those steps in FIGS. 9 and 10, the raceway region (the raceway surface and the core) is induction hardened and then tempered at a lower temperature.

The inner member or the cam may be subjected to any of the two heat treatment actions shown in FIGS. 9 and 10.

Any of the two heat treatment actions including the step of carbonitriding develops a carbonitrided layer or nitrogen-rich layer. During the step of carbonitriding, when the material, namely steel, is high in carbon content, it may hardly permit the diffusion of carbon into its surface under a common carbonitriding atmosphere. Specifically, when the steel is of a high carbon content, its resultant carburized layer may be developed at a higher concentration of carbon or not. On the other hand, common steels contain 0.025% by weight or less of nitrogen, depending more or less on the concentration of chrome among others, and the nitrogen-rich layer can readily be developed regardless of carbon content.

The microstructure of resultants after the heat treatment shown in FIGS. 9 and 10 will now be explained. The step of carbonitriding is conducted above the A1 transformation point. During the carbonitiriding, the nitrogen-rich layer is developed. The nitrogen-rich layer incorporates an over-eutectic structure of Fe impregnated with penetrating atoms, C and N, where carbides are deposited in an austenite form (two phases in a combination). The nitrogen-rich layer is constructed of an over-eutectic steel. The regions which have not been subjected to the action of carbonitriding remain in an austenite form as in the original composition of steel. Also, the action of carbonitriding may develop two phases of ferrite and austenite or cementite and austenite depending on the temperature to be used.

In the cooling step shown in FIG. 9, the temperature is slowly decreased after the step of carbonitriding (referred to as a heat pattern H1). This slow cooling step is provided for softening the structure and improving its workability. During the slow cooling, austenite transforms to pearlite consisting mainly of ferrite and cementite. But, pearlite can be less hardened by not laminating but aggregating cementite. Therefore, the slow cooling can be continued until its temperature drops to a level for the step of carbonitriding (A1 transformation point minus 100° C.). It is however true that the cementite is unfavorably aggregated even if the slow cooling is conducted further down to a lower temperature, thus simply consuming the time and declining the efficiency of the action. The temperature is preferably decreased to about 620° C. This may thus be followed by air cooling, water cooling, or oil cooling for minimizing the consumption of time.

In the nitrogen-rich layer, as pearlite is developed from the austenite in the (carbide+austenite) structure, the carbide will be aggregated.

In the action shown in FIG. 10 (referred to as a heat pattern H2), the step of carbonitriding is followed by a hardening step using, for example, oil cooling. This develops martensite among others from the austenite in the original composition of the steel being used. The structure of martensite is hard and is unfavorable for mechanical joining as by staking or swage locking, so that the tempering process is adopted. The tempering is rapidly carried out at a high temperature slightly lower than but as close as possible to the A1 transformation point. The tempering at high temperatures is desired. Specifically, the temperature at the tempering process is set to a range preferably from the A1 transformation point to 650° C. or alternatively from the A1 transformation point to 680° C. The tempering can thus eliminate the martensite at higher dislocation density and develop ferrite at lower dislocation density and aggregated cementite.

Also in the nitrogen-rich layer, martensite may be developed from the austenite in the (carbide+austenite) structure during the hardening as by oil cooling. The martensite is also softened by the tempering process. Simultaneously, carbide is aggregated. It is noted that the above description of the microstructure omits secondary factors including nitrogen and other complicated substances in the actual microstructure.

Then, a step of induction hardening follows in both the heat patterns H1 and H2. Prior to the induction hardening, the nitrogen-rich layer contains a combination of aggregated carbide (at higher rate) and ferrite. The induction hardening process includes a step of rapid heating up where austenite is nucleated while carbide is shifted to a solid solution state. As the concentration of dispersed carbide is significantly high, the nucleation of austenite will occur at higher density. The austenite structure comprising austenite aggregations is very fine in the grain size. The nitrogen-rich layer incorporates an over-eutectic structure of steel which contains carbide. The presence of carbide may interrupt the growth of fine austenite grains. As the result, the austenite grains in the nitrogen-rich layer remain very small in the size. As the temperature rises during the rapid heating up, the carbide is shifted to a solid solution state hence allowing the austenite to contain a more amount of carbons in the solid solution state. Simultaneously, the core will be modified by the same manner as the raceway surface although the nitrogen-rich layer is absent.

By induction hardening where the rapid heating is followed by quenching, austenite is transformed to martensite. The austenite includes a solid solution state of carbon and remains stable. This allows some austenite to remain unchanged and left along martensite aggregations as the retained austenite. The retained austenite is very small in the size as remaining among martensite aggregations. The retained austenite is 10% to 50% by volume.

Then, a step of tempering at a temperature of 180° C. is conducted so as not to sharply decline the hardness. The tempering at 180° C. permits the dislocation at high density to be maintained. This step is intended for stabilizing the microstructure. During the tempering, the aggregation of cementite will hardly occur while the hardness remains not declined. The microstructure after the induction hardening which contains the retained austenite is tough and increases the life of the rolling bearing under hostile conditions.

As the result, the austenite grain size number in the raceway regions (the raceway surface and the core) of the rolling bearing can be as small as not greater than 11. Also, the hardness of the raceway surface is HV653 or higher while the retained austenite ranges from 10% to 50% by volume or preferably from 15% to 35% by volume. The hardness of the core of the shaft is HV550 or higher while the retained austenite is present. The other regions than the raceway regions, including the journal ends, are not higher than HV300 in the hardness. The rolling bearing after the heat treatment can hence be improved in the physical strength or fatigue fracture strength in particular, lengthened in the rolling contact life, and yet facilitating the mechanical joining as by staking or swage locking.

Figure 11:
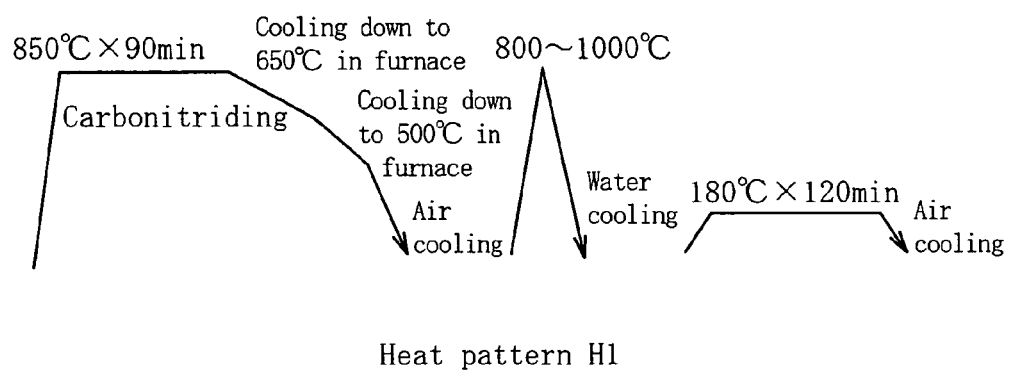
FIG. 11 is a profile showing an example H1 of the heat treatment pattern.
Figure 12:
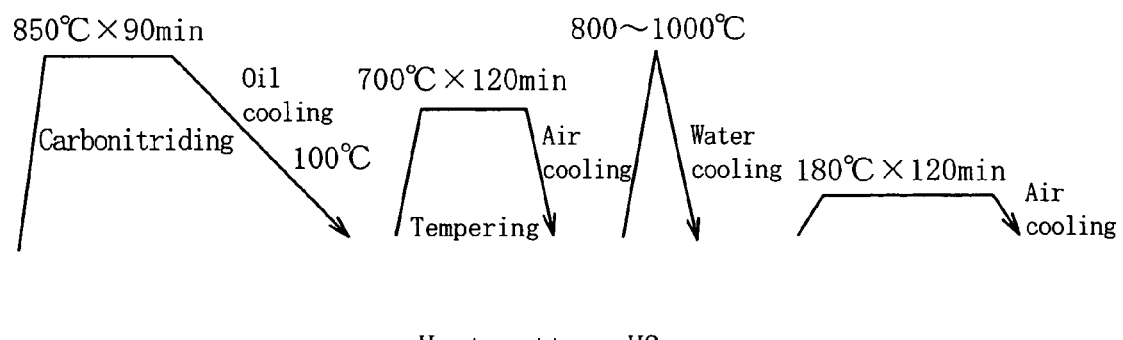
FIG. 12 is a profile showing another example H2 of the heat treatment pattern.

Samples of bearing steel SUJ2 were subjected to the heat treatment according to the heat pattern H1 shown in FIG. 11 corresponding to FIG. 9 and the heat pattern H2 shown in FIG. 12 corresponding to FIG. 10. Specifically, a steel pipe or a cold worked steel material was subjected to the steps of carbonitriding at a temperature above the A1 transformation point and then slow cooling (in a furnace) to a temperature below the A1 transformation point (according to the heat pattern H1) or rapid cooling down to a temperature below the A1 transformation point followed by tempering (according to the heat pattern H2). This was followed by the induction hardening over the raceway regions (the raceway surface and the core). The temperatures according to the heat patterns H1 and H2 are as shown in FIGS. 11 and 12, respectively.

Figure 13A:
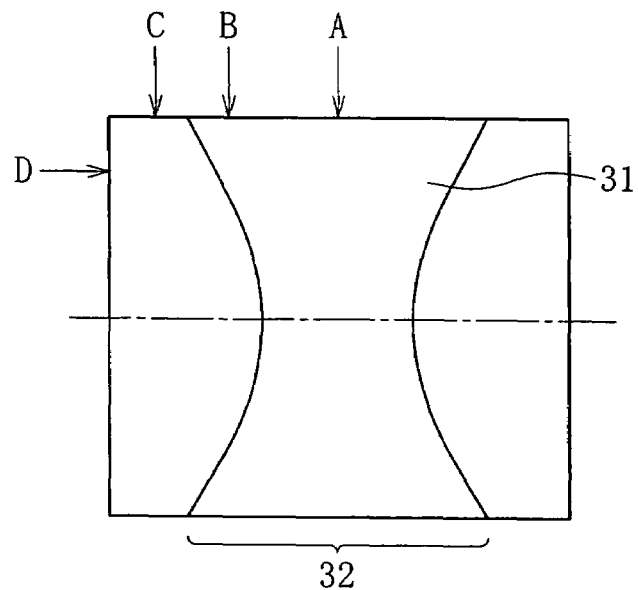
FIG. 13A is a front view of a test piece showing the location of measuring the hardness.
Figure 13B:
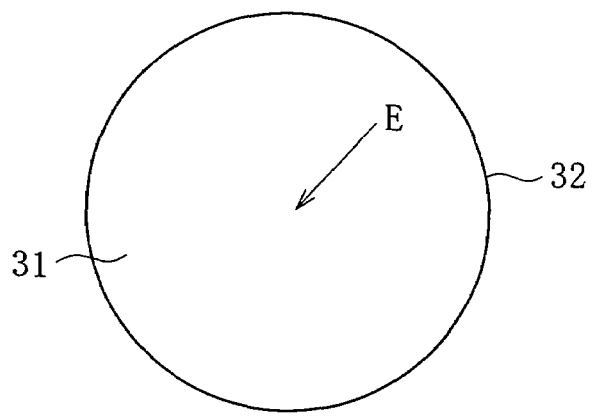
FIG. 13B is a cross sectional view of the test piece showing the location of measuring the hardness.

Samples of the roller shaft 2 and the planet gear shaft 74 after the heat treatment by the foregoing manner are desired in which the retained austenite ranges from 10% to 50% by volume or preferably from 15% to 35% by volume and austenkite grain size number is not smaller than 11. The raceway surface and the core of the shaft are hardened where the retained austenite is present. A hardness test was conducted on these samples. Also, for comparison, the hardness test was conducted on conventional samples J subjected to only a step of induction hardening over their surface region. The shape and the measuring position of the sample at the test are shown in FIGS. 13A and 13B. FIG. 13A is a front view of the sample while FIG. 13B is a cross sectional view taken across the center of the sample indicated by arrow A. Resultant measurements are shown in Table 1. As shown in FIGS. 13A and 13B, the raceway region 32 of the sample includes a portion 31 hardened by induction hardening and extending from the surface to the core.

TABLE 1

Resultant measurements of hardness

| Measured Location (FIGS. 13A & 13B) | Comparison Sample J | Invention Sample 1 at heat pattern H1 | Sample 2 at heat pattern H2 |
|---|---|---|---|
| A | 780 | 790 | 790 |
| B | 735 | 800 | 800 |
| C | 220 | 250 | 260 |
| D | 210 | 260 | 270 |
| E | 215 | 730 | 710 |
| Retained austenite (% by volume) | 7.5 | 24.7 | 25.5 |
| Austenite grain size number | 10.5 | 12 | 12 |

As apparent from Table 1, the hardness of the samples 1 and 2 of the present invention is as high as HV790 to HV800 at locations indicated by arrows A and B of the raceway region 32 and from HV710 to HV730 at the core, i.e. that region indicated by arrow E in FIG. 13B. The hardness of the regions other than the raceway region, i.e. those regions indicated by arrows C and D in FIG. 13A ranges from HV250 to HV270 which are favorable for conducting the mechanical joining as by staking or swage locking. The hardness of the conventional sample J ranges from HV735 to HV780 at the locations A and B of the raceway surface but is as low as HV215 at the core E. The other regions C and D are not affected by the induction hardening and are also as low as HV210 to HV220 in the hardness.

TABLE 2

Samples

| | Sample | Heat Treatment | Austenite grain size at A | Retained austenite (% by volume) |
|---|---|---|---|---|
| Comparison | Sample J | Induction Hardening over raceway region | 10.5 | 7.5 |
| Invention | Sample 1 | heat pattern H1 | 12 | 24.7 |
| | Sample 2 | heat pattern H2 | 12 | 25.5 |

As apparent from Table 2, the samples 1 and 2 of the present invention are as small as 12 of the grain size number while the conventional sample J is as bit large as 10.5. Also, the retained austenite at the point A is as favorable as 24.7% by volume in the sample 1 and 25.5% by volume in the sample 2 of the present invention. On the other hand, the retained austenite in the conventional sample J is 7.5% by volume which is too low to protect from surface damage.

Figure 14:
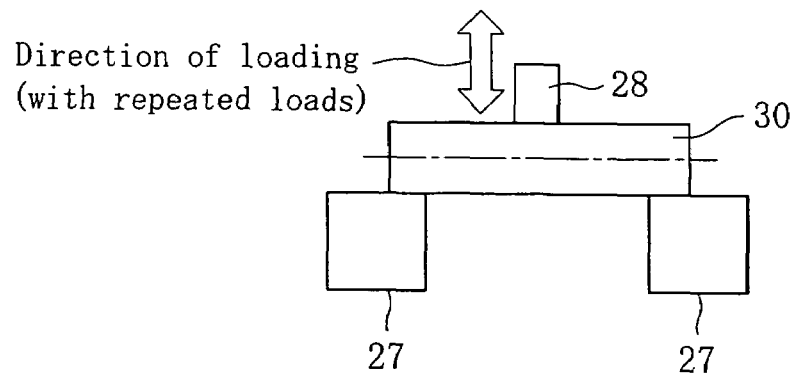
FIG. 14 is a schematic view of a fatigue fracture tester.

The samples 1 and 2 of the present invention and the conventional sample J were subjected to a fatigue fracture test for examining the physical strength. The test was conducted with each sample 30 placed on and between two supports 27 and stressed at the center region repeatedly by a load from a loading member 28, as shown in FIG. 14. The conditions of the test were as shown in Table 3. The number of loading times under a particular load was examined before the occurrence of fracture and plotted to have a profile of load/number of loading actions. Resultant measurements of the test are shown in Table 4.

TABLE 3

Fatigue fracture test conditions

| Load | 2000-10000 N (optional) |
|---|---|
| Loading frequency | 10-120 Hz (Determined by load) |
| Loading waveform | Sine wave |
| Number of loading times | Until fracture occurs |

TABLE 4

Fatigue fracture test result

| | Sample | Load to fracture after $10^6$ loading times (rate) |
|---|---|---|
| Comparison | Sample J | 1 |
| Invention | Sample 1 | 1.32 |
| | Sample 2 | 1.28 |

Table 4 illustrates the rate of load to fracture after $10^6$ loading times to the load to fracture of the conventional sample J which is one. The rate is 1.32 at the sample 1 of the present invention which is greater by 32% than that of the conventional sample J. The rate is 1.28 at the sample 2 of the present invention which is greater by 28% than that of the conventional sample J. It is hence judged that the strength to fatigue fracture is significantly improved.

Figure 15:
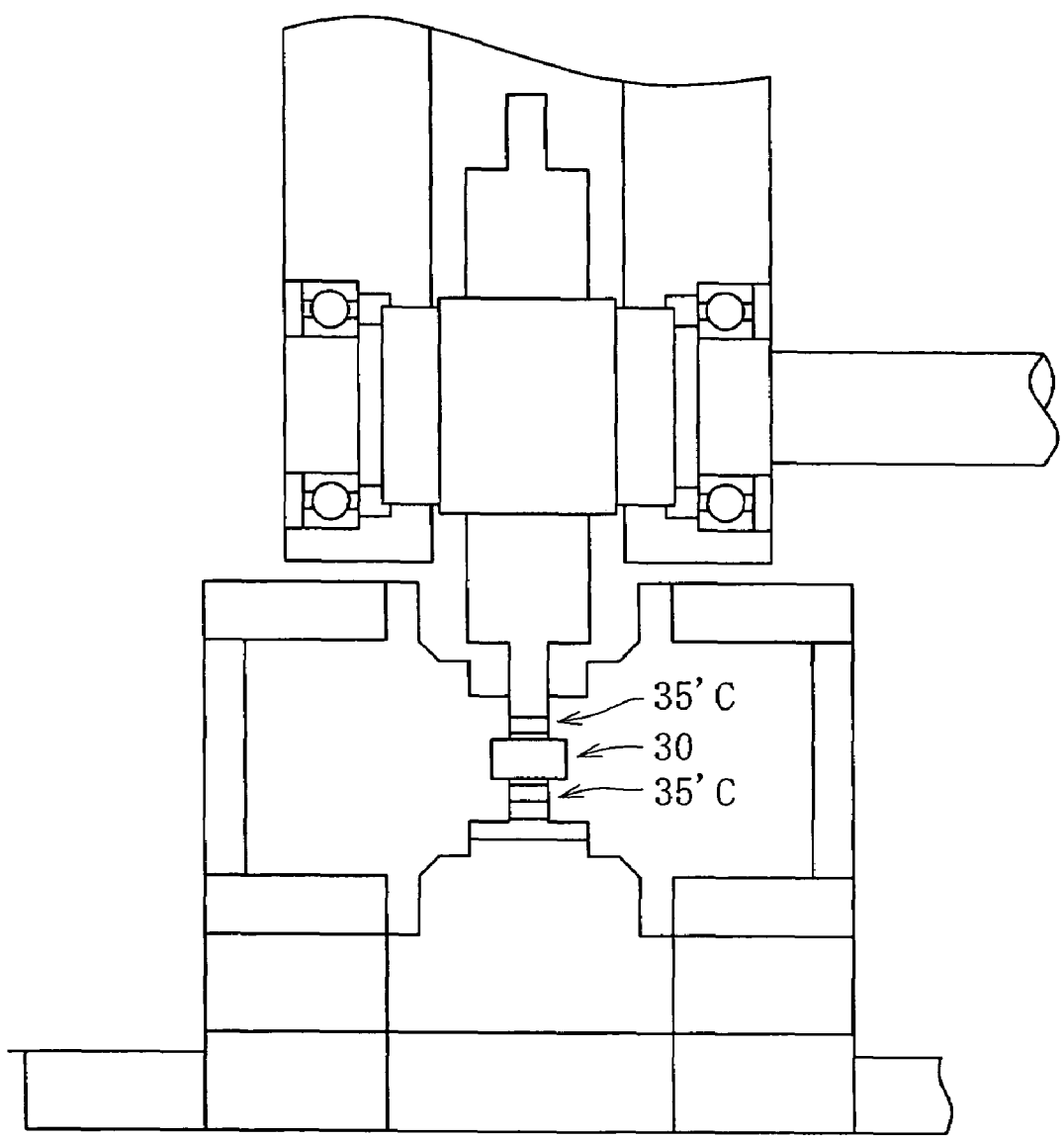
FIG. 15 is a longitudinally cross sectional view of the fatigue fracture tester.

The samples 1 and 2 were further subjected to an outer ring rolling type fatigue life test. The austenite grain size and the retained austenite at the point A (on the surface) are shown in Table 2 while the test conditions are listed in Table 5. A test apparatus for conducting the outer ring rolling type fatigue life test is shown in FIG. 15. The fatigue life test apparatus has a test piece 30 held from both, upper and lower, sides by rollers 35 which rotate and run directly on the surface of the test piece 30 under pressure, whereby the test piece 30 receives a stress.

TABLE 5

Fatigue life test conditions

| Items | Description |
|---|---|
| Tester | Outer ring rolling type lift tester |
| Test piece | Rocker arm bearing |
| Load (N) | 2200 N |
| Outer ring rolling speed | 7000 rpm |
| Lubrication | Engine oil 10w-30 |
| Oil temperature | 100° C. |
| Life | Peel-off span |

During the test using the above conditions, surface damage or subsurface origin flaking may be found. Accordingly, the life before the occurrence of both surface damage and subsurface origin flaking can be measured through the test. Resultant measurements of the fatigue test are shown in Table 6.

TABLE 6

| | Fatigue test result, | |
| --- | --- | --- |
| | Test piece | Life ratio (L10) |
| Comparison | Sample J | 1.0 |
| Invention | Sample 1 | 3.8 |
| | Sample 2 | 3.3 |

As apparent from Table 6, the samples 1 and 2 of the present invention are 3.3 to 3.8 times longer in the life than the conventional sample J. It may be concluded that the conventional sample J is short in the fatigue life because of an unfavorable metal structure (not proper in the austenite grain size and the retained austenite) which has not been subjected to the carbonitriding and the induction hardening from the surface to the core.

The rolling bearing of the present invention has the raceway regions advantageous in all the surface damage, the rolling contact fatigue life, and the fatigue fracture strength and yet possesses soft ends for ease of mechanical joining as by staking or swage locking, thus being well suited for use on the rocker arm roller shaft in an automobile engine and the planet gear shaft in a planetary gear mechanism.

The foregoing embodiments and modifications are not in the restrictive sense but only illustrative. The present invention is not limited to the description but covered by the teachings of the claims and further modifications and changes are intended to be made without departing from the scope and equivalent of the claims.

What is claimed is:

1. A rolling bearing comprising:
   an outer member;
   an inner member provided inwardly of the outer member; and
   rolling elements provided between the inner member and the outer member,
   wherein the inner member is made of SUJ2 steel, and
   wherein the inner member has
   (i) two ends and a race surface, the race surface being a surface on which the rolling elements run,
   (ii) a nitrogen-rich layer,
   (iii) at least 11 in JIS austenite grain size number and at least HV653 in Vickers hardness number at the race surface,
   (iv) a Vickers hardness number no greater than HV300 at the two ends, and
   (v) a Vickers hardness number of at least HV550 at a core thereof, the core being beneath a widthwise midpoint of the race surface.

2. The rolling bearing of claim 1, wherein the inner member is configured such that regions other than the race surface and the core contain ferrite and carbide in a microstructure.

3. The rolling bearing of claim 1, wherein the race surface of the inner member is hardened by induction hardening.

4. The rolling bearing of claim 1, wherein the race surface of the inner member contains 10% to 50% by volume of retained austenite, and
   wherein the core of the inner member contains retained austenite.

5. The rolling bearing of claim 1, wherein at least one of the inner member and the outer member is subjected to carbonitriding at a temperature higher than A1 transformation point, slow cooled to a temperature lower than the A1 transformation point and then hardened by induction hardening at least over the race surface thereof.

6. The rolling bearing of claim 1, wherein the bearing is configured to support a rocker arm.

7. The rolling bearing of claim 1, wherein the bearing is configured for use in a planetary gear mechanism.

8. The rolling bearing of claim 1, wherein the inner member has a carbon content of 0.95% to 1.1%.

* * * * *